(12) United States Patent
Tan et al.

(10) Patent No.: US 12,262,261 B2
(45) Date of Patent: Mar. 25, 2025

(54) CLOCK SYNCHRONIZATION METHOD AND DEVICE, AND STORAGE MEDIUM

(71) Applicant: ZTE CORPORATION, Shenzhen (CN)

(72) Inventors: Jie Tan, Shenzhen (CN); Xiubin Sha, Shenzhen (CN); Bo Dai, Shenzhen (CN); Ting Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 240 days.

(21) Appl. No.: 17/918,539

(22) PCT Filed: Apr. 9, 2021

(86) PCT No.: PCT/CN2021/086088
§ 371 (c)(1),
(2) Date: Oct. 12, 2022

(87) PCT Pub. No.: WO2021/208806
PCT Pub. Date: Oct. 21, 2021

(65) Prior Publication Data
US 2023/0136428 A1 May 4, 2023

(30) Foreign Application Priority Data
Apr. 14, 2020 (CN) .......................... 202010289226.3

(51) Int. Cl.
*H04W 36/00* (2009.01)
*H04W 48/10* (2009.01)
*H04W 56/00* (2009.01)

(52) U.S. Cl.
CPC ... *H04W 36/0061* (2013.01); *H04W 36/0072* (2013.01); *H04W 36/00835* (2018.08); *H04W 48/10* (2013.01); *H04W 56/001* (2013.01)

(58) Field of Classification Search
CPC ......... H04W 36/0061; H04W 36/0072; H04W 36/00835; H04W 36/0005;
(Continued)

(56) References Cited

U.S. PATENT DOCUMENTS 9,264,961 B1    2/2016  Shah et al.
2015/0131606 A1*  5/2015  Kobayashi .......... H04W 72/542
                                                          370/330
(Continued)

FOREIGN PATENT DOCUMENTS

AU    2015274867 A1 *  1/2017 .......... H04B 17/318
CN    103190185 A     7/2013
(Continued)

OTHER PUBLICATIONS

Extended European Search Report in Application No. 21788944.3, dated Apr. 23, 2024, 17 pages.
(Continued)

*Primary Examiner* — Chi H Pham
*Assistant Examiner* — Vladislav Y Agureyev
(74) *Attorney, Agent, or Firm* — Morgan, Lewis & Bockius LLP

(57) ABSTRACT

Provided are a clock synchronization method and apparatus, and a storage medium. The clock synchronization method includes that: when a source base station determines that a
(Continued)

If a source base station determines that a UE satisfies a handover condition, the source base station sends a handover request to a target base station, where the handover request includes a request for precision clock information — S1010

The source base station receives the precision clock information of the target base station — S1020 user equipment (UE) satisfies a handover condition, the source base station sends a handover request to a target base station, where the handover request includes a request for precision clock information; and the source base station receives the precision clock information of the target base station.

17 Claims, 9 Drawing Sheets

(58) Field of Classification Search
CPC ......... H04W 36/0077; H04W 36/0016; H04W 48/10; H04W 56/001; H04W 56/0015; H04J 3/0638
See application file for complete search history.

(56) References Cited

U.S. PATENT DOCUMENTS

| | | | |
|---|---|---|---|
| 2016/0301504 A1* | 10/2016 | Toskala | H04W 16/14 |
| 2017/0251418 A1* | 8/2017 | Aweya | H04L 43/106 |
| 2018/0049079 A1 | 2/2018 | Ozturk et al. | |
| 2018/0167849 A1 | 6/2018 | Wang et al. | |
| 2020/0120566 A1* | 4/2020 | Miao | H04L 1/1642 |
| 2020/0145940 A1* | 5/2020 | Gage | H04W 36/04 |
| 2020/0314784 A1* | 10/2020 | Baek | H04W 56/0015 |
| 2020/0351728 A1* | 11/2020 | Chien | H04W 36/00725 |
| 2021/0120473 A1* | 4/2021 | Yao | H04W 36/0079 |
| 2022/0007232 A1* | 1/2022 | Sha | H04L 69/04 |
| 2022/0038964 A1* | 2/2022 | Wang | H04W 36/328 |
| 2022/0110076 A1* | 4/2022 | Shimoda | H04W 72/0446 |
| 2022/0124654 A1* | 4/2022 | Takeda | H04W 72/121 |
| 2022/0256408 A1* | 8/2022 | Fu | H04W 36/0064 |
| 2022/0338143 A1* | 10/2022 | Fu | H04W 56/001 |
| 2022/0417883 A1* | 12/2022 | Fu | H04J 3/12 |

FOREIGN PATENT DOCUMENTS

| | | |
|---|---|---|
| CN | 111092705 A | 5/2015 |
| CN | 107431960 A | 12/2017 |
| CN | 108024294 A | 5/2018 |
| CN | 111901864 A | 11/2020 |

OTHER PUBLICATIONS

Huawei et al., "TP for evaluation of solution 1", 3GPP TSG-RAN3 Meeting #92, R3-161483, Nanjing, China, May 23-27, 2016, 4 pages.
Huawei, "Consideration on the accurate reference timing in TSN for I-IoT", 3GPP TSG-RAN WG3 #101-bis, R3-185808, Chengdu, China, Oct. 8-12, 2018, 4 pages.
ZTE Corporation, et al., "Signaling aspects for accurate reference timing delivery in TSC", GPP TSG-RAN WG2 #107bis, R2-1912897 (Revision of R2-1908859), Chongqing, China, Oct. 14-18, 2019, 7 pages.
International Search Report in Application No. PCT/CN2021/086088, dated Jul. 7, 2021, 4 pages including English translation.
ZTE Corporation et al., "Remaining issues for accurate reference timing delivery in TSC", 3GPP TSG-RAN2 Meeting #106, R2-1905647, May 17, 2019, 4 pages.
First Search Report in Chinese Application No. 2020102892296, dated Nov. 6, 2024, 8 pages, including translation.
First Office Action in Chinese Application No. 202010288226.3, dated Nov. 8, 2024, 25 pages, including translation.

* cited by examiner

```
┌─────────────────────────────────────────────────────────────────────┐
│ If a source base station determines that a UE satisfies a handover  │
│ condition, the source base station sends a handover request to a    │  S1010
│ target base station, where the handover request includes a request  │
│ for precision clock information                                     │
└─────────────────────────────────────────────────────────────────────┘
                                  │
                                  ▼
┌─────────────────────────────────────────────────────────────────────┐
│ The source base station receives the precision clock information   │  S1020
│ of the target base station                                          │
└─────────────────────────────────────────────────────────────────────┘
```

FIG. 1

```
┌─────────────────────────────────────────────────────────────────────┐
│ The source base station sends a second RRC reconfiguration message │  S2010
│ to the UE, where the second RRC reconfiguration message includes a │
│ list of neighbor cells that support a precision clock information   │
│ indication                                                          │
└─────────────────────────────────────────────────────────────────────┘
                                  │
                                  ▼
┌─────────────────────────────────────────────────────────────────────┐
│ The source base station receives an RRC ReconfigurationComplete     │
│ message sent by the UE, where the RRC ReconfigurationComplete       │  S2020
│ message is sent by the UE after the UE performs measurement         │
│ configuration according to the second RRC reconfiguration message   │
└─────────────────────────────────────────────────────────────────────┘
                                  │
                                  ▼
┌─────────────────────────────────────────────────────────────────────┐
│ The source base station receives a measurement report of a neighbor │
│ cell that supports the precision clock information sent by the UE,  │
│ the neighbor cell corresponding to the neighbor cell measurement    │  S2030
│ report is the target cell to which the UE is handed over, and the   │
│ target base station to which the target cell belongs is different   │
│ from the source base station                                        │
└─────────────────────────────────────────────────────────────────────┘
                                  │
                                  ▼
┌─────────────────────────────────────────────────────────────────────┐
│ If the source base station determines that the UE satisfies the     │
│ handover condition, the source base station sends the handover      │  S2040
│ request to the target base station, where the handover request      │
│ includes the request for the precision clock information            │
└─────────────────────────────────────────────────────────────────────┘
                                  │
                                  ▼
┌─────────────────────────────────────────────────────────────────────┐
│ The source base station receives the precision clock information   │  S2050
│ of the target base station                                          │
└─────────────────────────────────────────────────────────────────────┘
                                  │
                                  ▼
┌─────────────────────────────────────────────────────────────────────┐
│ After receiving the handover request acknowledge sent by the target │
│ base station, the source base station sends the first RRC           │
│ reconfiguration information to the UE, where the first RRC          │  S2060
│ reconfiguration information includes a clock difference, and the    │
│ clock difference is a difference between a clock of the target base │
│ station and a clock of the source base station                      │
└─────────────────────────────────────────────────────────────────────┘
```

FIG. 2

A UE receives first RRC reconfiguration information sent by a source base station, where the first RRC reconfiguration information includes a clock difference, and the clock difference is a difference between a clock of a target base station and a clock of the source base station — S3010

FIG. 3

A UE receives a second RRC reconfiguration message sent by a source base station, where the second RRC reconfiguration message includes a list of neighbor cells that support a precision clock information indication — S4010

The UE performs measurement configuration according to the second RRC reconfiguration message and sends an RRC ReconfigurationComplete message to the source base station — S4020

The UE measures cells in the list of neighbor cells that support the precision clock information indication and sends the measurement report of the neighbor cell that supports the precision clock information to the source base station, where the neighbor cell corresponding to the neighbor cell measurement report is the target cell to which the UE is handed over, a target base station to which the target cell belongs is different from the source base station, and the neighbor cell measurement report is used for the source base station to acquire the precision clock information of the target base station — S4030

The UE receives first RRC reconfiguration information sent by the source base station, where the first RRC reconfiguration information includes a clock difference, and the clock difference is a difference between a clock of the target base station and a clock of the source base station — S4040

The UE performs delay compensation on the target cell according to the clock difference — S4050

FIG. 4

CLOCK SYNCHRONIZATION METHOD AND DEVICE, AND STORAGE MEDIUM

CROSS REFERENCE TO RELATED APPLICATIONS

This is a National Stage Application filed under 35 U.S.C. 371 based on International Patent Application No. PCT/CN2021/086088, filed on Apr. 9, 2021, which claims priority to Chinese Patent Application No. 202010289226.3 filed with the China National Intellectual Property Administration (CNIPA) on Apr. 14, 2020, the disclosures of which are incorporated herein by reference in their entireties.

TECHNICAL FIELD

The present application relates to wireless communication networks, for example, a clock synchronization method and apparatus, and a storage medium.

BACKGROUND

In a New Radio (NR) standard, considering the mobility of a terminal and other reasons, a serving cell currently accessed by the terminal may be handed over at any time. In a handover process of the serving cell currently accessed by the terminal, if the handover is performed between the serving cell and a neighbor cell across base stations, a clock of the neighbor cell may not synchronize with a clock of the current cell. Therefore, it is necessary to pay attention to delay compensation between a target cell and the current serving cell, that is, the base station needs to be notified of clock information of the target cell in the handover process.

Therefore, during cell handover across base stations, precision clock synchronization between the target cell and the terminal needs to be achieved, and the required transmission delay is rather small. To achieve the precision clock synchronization between the target cell and the terminal, a target base station needs to transmit precision clock information to the terminal. Therefore, how to indicate the precision clock information of the target base station or a clock difference between the terminal and the target base station to the terminal and achieve the precision clock synchronization between the target cell and the terminal is an urgent issue to be solved.

SUMMARY

The present application provides a clock synchronization method and apparatus, and a storage medium so that precision clock synchronization between a user equipment (UE) and a target base station to which the UE is handed over is achieved after cell handover.

An embodiment of the present application provides a clock synchronization method. The method includes the following.

When a source base station determines that a UE satisfies a handover condition, the source base station sends a handover request to a target base station, where the handover request includes a request for precision clock information; and the source base station receives the precision clock information of the target base station.

An embodiment of the present application further provides a clock synchronization method. The method includes the following.

A UE receives first radio resource control (RRC) reconfiguration information sent by a source base station, where the first RRC reconfiguration information includes a clock difference, where the clock difference is a difference between a clock of a target base station and a clock of the source base station.

An embodiment of the present application further provides a clock synchronization method. The method includes the following.

A core access and mobility management function (AMF) receives a handover required message that is sent by a source base station and includes a request for precision clock information; the AMF sends a handover request including the request for the precision clock information to a target base station; the AMF receives third signaling that is sent by the target base station and carries the precision clock information of the target base station; and the AMF sends second signaling carrying the precision clock information of the target base station to the source base station.

An embodiment of the present application further provides a clock synchronization method. The method includes the following.

A target base station receives one of the following: a handover request message that is sent by a source base station and includes a request for precision clock information, a handover request message that is sent by an AMF and includes a request for precision clock information, or an RRC reestablishment request message that is sent by a UE and includes a request for precision clock information; and the target base station sends the precision clock information to the source base station through first signaling, or sends the precision clock information to the AMF through third signaling, or sends the precision clock information to the UE through an RRC response message.

An embodiment of the present application further provides a base station including a processor and a memory, where the processor is configured to execute program instructions stored in the memory to perform the above-mentioned first clock synchronization method.

An embodiment of the present application further provides a UE including a processor and a memory, where the processor is configured to execute program instructions stored in the memory to perform the above-mentioned second clock synchronization method.

An embodiment of the present application further provides an AMF including a processor and a memory, where the processor is configured to execute program instructions stored in the memory to perform the above-mentioned third clock synchronization method.

An embodiment of the present application further provides a base station including a processor and a memory, where the processor is configured to execute program instructions stored in the memory to perform the above-mentioned fourth clock synchronization method.

An embodiment of the present application further provides a storage medium storing computer programs which, when executed by a processor, perform the above-mentioned clock synchronization method.

BRIEF DESCRIPTION OF DRAWINGS

FIG. 1 is a flowchart of a clock synchronization method according to an embodiment;

FIG. 2 is a flowchart of another clock synchronization method according to an embodiment;

FIG. 3 is a flowchart of another clock synchronization method according to an embodiment;

FIG. 4 is a flowchart of another clock synchronization method according to an embodiment;

DETAILED DESCRIPTION

Figure 5:
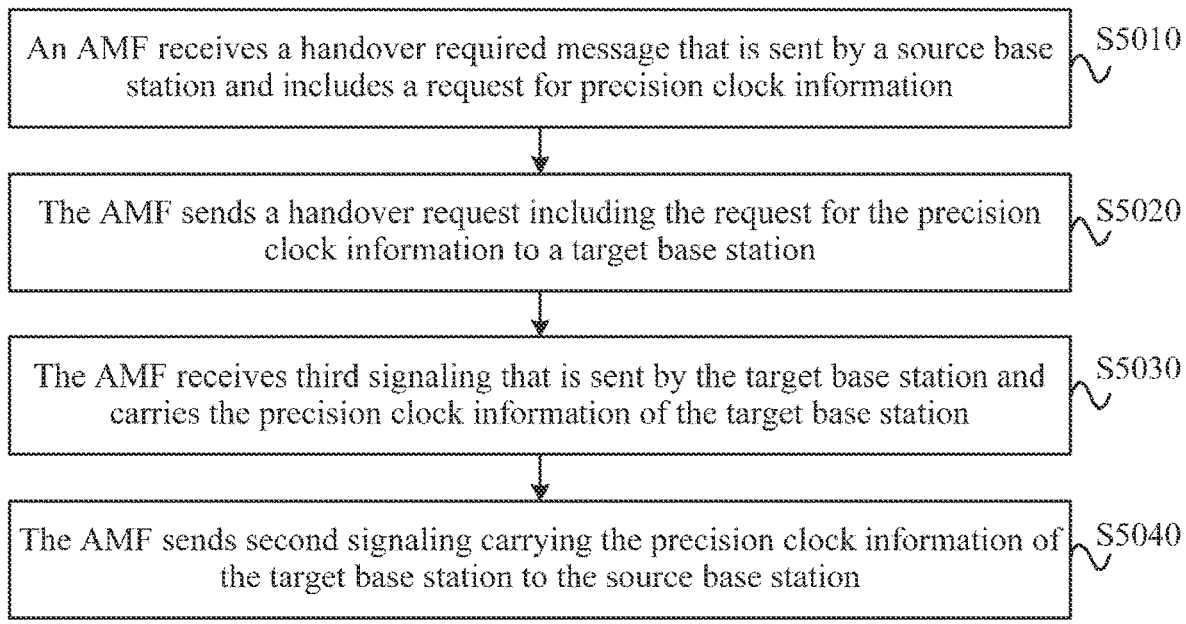
FIG. 5 is a flowchart of another clock synchronization method according to an embodiment.

Embodiments of the present application are described below in conjunction with drawings.

FIG. 1 is a flowchart of a clock synchronization method according to an embodiment. As shown in FIG. 1, the method provided in this embodiment includes the following.

In S1010, if a source base station determines that a UE satisfies a handover condition, the source base station sends a handover request to a target base station, where the handover request includes a request for precision clock information.

When the UE, that is, a terminal is in a currently accessed serving cell and cell handover needs to be performed due to movement or other reasons, if a target cell to which the UE is handed over and the current serving cell belong to different base stations, cell handover across base stations is involved. Since clock information of different base stations may be different, when the UE performs the cell handover across base stations, a communication problem of the UE in the target cell after the handover may occur due to clocks of the source base station and the target base station being out of synchronization. The source base station is a base station to which the current serving cell of the UE belongs, and the target base station is a base station to which the target cell that the UE is handed over to belongs. In the embodiments of the present application, each of the source base station and the target base station may be a next generation NodeB (gNB) in the 5th generation mobile communication (5G).

The clock synchronization method provided in this embodiment is applied to the source base station, that is, the base station to which the serving cell belongs before the UE performs cross-cell handover. When the source base station determines that the UE accessing a cell to which the source base station belongs satisfies the handover condition, the source base station needs to send the handover request to the target base station to which the target cell that the UE is handed over to belongs, where the handover request includes a request for precision clock information. Since the source base station currently accessed by the UE may be different from the target base station to which the target cell that the UE is handed over to belongs, when the UE satisfies the handover condition, in order that a clock of the UE after the handover is synchronous with a clock of the target cell, the source base station needs to acquire the precision clock information of the target base station. The source base station sends the handover request to the target base station, where the handover request is used for requesting that the serving cell of the UE be handed over to the target cell provided by the target base station, and the handover request includes the request for the precision clock information. The precision clock information is a clock with a granularity of less than 10 milliseconds.

The case where the UE satisfies the handover condition may, for example, be a case where a service quality of a neighbor cell is better than a service quality of the current serving cell, or a case where a received signal strength of the neighbor cell is higher than a received signal strength of the current serving cell, or other cases. The source base station may determine whether the UE satisfies the handover condition according to a received neighbor cell measurement report sent by the UE.

In S1020, the source base station receives the precision clock information of the target base station.

After the source base station sends the handover request to the target base station, the source base station receives the precision clock information of the target base station. The precision clock information of the target base station indicates a precise clock of the target base station. The source base station and the UE may determine a clock difference between the source base station and the target base station according to the precision clock information of the target base station and clock information of the source base station so that clock synchronization may be performed according to the clock difference.

There are many manners for the source base station to acquire the precision clock information of the base station (target base station) to which the neighbor cell belongs. In an embodiment, the source base station may directly send the handover request to the target base station to which the neighbor cell belongs through an Xn interface between the base stations, where the handover request includes the request for the precision clock information. After the target base station receives the handover request, the source base station receives first signaling that is sent by the target base station and carries the precision clock information of the target base station. The first signaling is dedicated signaling for carrying the precision clock information. The first signaling may include any one of the following: handover request acknowledge, a retrieve UE context request, XN-U address indication, or UE context release.

In an embodiment, the source base station sends a handover required message to a core access and mobility management function (AMF) through an NG interface, where the handover required message includes the request for the precision clock information. When the AMF receives the handover required message, the AMF sends the handover request to the target base station to which the neighbor cell belongs and receives third signaling that is sent by the target base station and carries the precision clock information of the target base station, where the handover request includes the request for the precision clock information. Then, the source base station receives second signaling that is sent by the AMF and carries the precision clock information of the target base station. Each of the second signaling and the third signaling is dedicated signaling for carrying the precision clock information. The third signaling may include any one of the following: handover request acknowledge, a path switch request, or UE context release complete. The second signaling may include any one of the following: a handover command, path switch request acknowledge, a UE context release command, downlink radio access network (RAN) status transfer, paging, or location reporting control.

The source base station calculates the clock difference between the target base station and the source base station according to the precision clock information of the target base station and the clock information of the source base station. That is, a clock difference between the target cell and the current serving cell is calculated. The clock difference is calculated according to precision clock information of the target base station-clock information of the source base station.

When the source base station sends the handover required message to the AMF, after the AMF sends a handover request message to the target base station and the target base station determines that the UE can be handed over to the target cell, the UE obtains resource admission qualification of the target base station, then the target base station sends a handover request acknowledge message to the AMF, and the AMF sends a handover command message to the source base station.

After the source base station receives the precision clock information of the target base station, the source base station may calculate the clock difference between the target base station and the source base station according to the precision clock information of the target base station and the clock information of the source base station so that clock synchronization between the UE handed over to the target base station and the target base station may be performed according to the clock difference. The source base station may notify the UE of the precision clock information of the target base station so that the UE calculates the clock difference, or the source base station may calculate the clock difference and send the clock difference to the UE.

In an embodiment, the source base station may send first RRC reconfiguration information to the UE, where the first RRC reconfiguration information includes a clock difference, and the clock difference is a difference between a clock of the target base station and a clock of the source base station.

The source base station sends the first RRC reconfiguration information to the UE, where the first RRC reconfiguration information includes the clock difference between the target base station and the source base station. The UE may perform delay compensation on the target cell according to the clock difference between the target base station and the source base station. In the case where the clock difference is positive, it means that the clock of the target base station is earlier than the clock of the source base station, and the UE may send information in advance to achieve synchronization. In the case where the clock difference is negative, it means that the clock of the target base station is later than the clock of the source base station, and the UE may delay sending information to achieve synchronization. Since the first RRC reconfiguration information sent by the source base station to the UE includes the clock difference between the target base station and the source base station, the UE can use the same clock as the target cell to communicate in the target cell when the UE is handed over to the target cell provided by the target base station. The source base station determines that the UE may be handed over to the target base station after receiving the handover request acknowledge sent by the target base station. After the target base station determines that the UE may be handed over to the target cell, the UE obtains the resource admission qualification of the target base station, and the target base station sends the handover request acknowledge to the source base station. After the source base station receives the handover request acknowledge sent by the target base station, the source base station sends the first RRC reconfiguration information to the UE. Alternatively, the source base station may also send the first RRC reconfiguration information to the UE after receiving the precision clock information of the target base station. Alternatively, the source base station may also send other information including the clock difference between the target base station and the source base station to the UE.

In the clock synchronization method provided in this embodiment, if the source base station determines that the UE satisfies the handover condition, the source base station sends the handover request including the request for the precision clock information to the target base station, and then the source base station receives the precision clock information of the target base station so that precision clock synchronization between the UE and the target base station to which the UE is handed over can be achieved after cell handover.

In an embodiment, before the source base station determines that the UE satisfies the handover condition, the method further includes the following: the source base station receives a neighbor cell measurement report sent by the UE. Before performing the cell handover, the UE may measures the neighbor cell of the current serving cell and reports the neighbor cell measurement report to the base station to which the current serving cell belongs, that is, the source base station. After the source base station receives the neighbor cell measurement report, the source base station first determines whether the base station to which the measured neighbor cell belongs is the source base station; if so, since the target cell to which the UE is handed over and the current serving cell of the UE are both provided by the source base station, the source base station may directly perform the cell handover of the UE without the problem of clock non-synchronization. If the base station to which the neighbor cell corresponding to the neighbor cell measurement report sent by the UE and received by the source base station belongs is different from the source base station, after the UE is handed over from the serving cell to the neighbor cell, since clock non-synchronization between the source base station and the base station to which the neighbor cell belongs, a handover problem occurs. Therefore, in the case where the base station to which the neighbor cell corresponding to the neighbor cell measurement report sent by the UE to the source base station belongs is different from the source base station, the source base station acquires the precision clock information from the target base station.

The neighbor cell measurement report sent by the UE and received by the source base station may include an indication that the precision clock information is required, and the source base station determines that the UE needs to perform precision clock synchronization with the target base station according to the indication that the precision clock information is required. Alternatively, the source base station may receive the indication that the precision clock information is required sent by the UE before receiving the neighbor cell measurement report sent by the UE. The indication information sent by the UE may be carried in one of the following manners: a radio link control (RLC) status packet, a media access control control element (MAC CE), a media access control control preamble (MAC preamble), a packet data convergence protocol (PDCP) status packet, or an RRC message. Then, the neighbor cell measurement report sent by the UE does not need to include the indication that precision clock information is required. The source base station may determine that UE needs to perform precision clock synchronization with the target base station according to the indication that the precision clock information is required sent by the UE before the UE sends the measurement report.

FIG. 2 is a flowchart of a clock synchronization method according to another embodiment. As shown in FIG. 2, the method provided in this embodiment includes the following.

In S2010, a source base station sends a second RRC reconfiguration message to a UE, where the second RRC reconfiguration message includes a list of neighbor cells that support a precision clock information indication.

To obtain a cell supporting the precision clock information in a timely and accurate manner to enable the UE to perform cell measurement in a more targeted manner, and the source base station may send the second RRC reconfiguration message to the UE before receiving the neighbor cell measurement report sent by the UE. The second RRC reconfiguration message includes measurement control information, where the measurement control information includes the list of neighbor cells that support the precision clock information indication. Then the UE may perform measurement configuration according to the measurement control information. When the UE needs to perform the precision clock synchronization with the target cell after cell handover, the UE may perform neighbor cell measurement only for cells in the list of neighbor cells that support the precision clock information indication.

In S2020, the source base station receives an RRC ReconfigurationComplete message sent by the UE, where the RRC ReconfigurationComplete message is sent by the UE after the UE performs measurement configuration according to the second RRC reconfiguration message.

After the UE performs measurement configuration according to the second RRC reconfiguration message sent by the source base station, the source base station may receive the RRC ReconfigurationComplete message sent by the UE. Then, the UE that has a requirement for the precision clock information may measure a cell that supports the precision clock information, thereby reducing measurement objects and improving a measurement performance.

In S2030, the source base station receives a measurement report of a neighbor cell that supports the precision clock information sent by the UE, where the neighbor cell corresponding to the neighbor cell measurement report is the target cell to which the UE is handed over, and the target base station to which the target cell belongs is different from the source base station.

After the UE receives the second RRC reconfiguration message sent by the source base station, since the UE performs measurement configuration according to the second RRC reconfiguration message, the UE may measure neighbor cells in a targeted manner and only measure cells that support the precision clock information. Therefore, the source base station may receive the measurement report of the neighbor cell that supports the precision clock information sent by the UE.

Then, the source base station may perform S2040 to S2060. The source base station determines whether the UE is handed over according to the measurement report of the neighbor cell that supports the precision clock information and, in a handover process, performs delay compensation according to the clock difference between the source base station and the target base station to which the target cell that the UE is handed over to belongs. An implementation manner of S2040 to step S2060 is described in the embodiment shown in FIG. 1 and is not repeated here.

In S2040, if the source base station determines that the UE satisfies the handover condition, the source base station sends the handover request to the target base station, where the handover request includes the request for the precision clock information.

In S2050, the source base station receives the precision clock information of the target base station.

In S2060, after receiving the handover request acknowledge sent by the target base station, the source base station sends the first RRC reconfiguration information to the UE, where the first RRC reconfiguration information includes a clock difference, and the clock difference is a difference between a clock of the target base station and a clock of the source base station.

In the clock synchronization method provided in this embodiment, based on the embodiment shown in FIG. 1, since the source base station first receives the neighbor cell report sent by the UE and the source base station sends the second RRC reconfiguration message that includes the list of neighbor cells that support the precision clock information to UE so that the UE can perform measurement configuration according to the second RRC reconfiguration message. Therefore, the source base station can receive only the measurement report of the neighbor cell that supports the precision clock information sent by the UE. Thus, the UE that has the requirement for the precision clock information measures the cells that support the precision clock information, thereby reducing the measurement objects and improving the measurement performance.

In an embodiment, based on the embodiment shown in FIG. 1 or 2, if a radio link failure (RLF) occurs in the UE, to enable the UE to obtain the precision clock information about the target base station in a timely and accurate manner, the source base station of the UE may also broadcast system information block (SIB) information, where the SIB information includes a list of neighbor cells that support the precision clock information indication. The SIB information is used for enabling the UE to select the target cell from the list of neighbor cells that support the precision clock information indication when the RLF occurs, so as to complete RRC reestablishment. The SIB information broadcasted by the source base station may be SIB3 or SIB4 information, and parameters in the SIB3 or SIB4 information are for the current serving cell. After receiving the SIB information that includes the list of neighbor cells that support the precision clock information and is broadcasted by the source base station, the UE may perform cell selection for the cells that support the precision clock information. When the UE selects a suitable cell, the UE sends an RRC reestablishment request message to the target base station to which the selected target cell belongs, where the message includes the request for the precision clock information. On the basis that the target base station receives an RRC reestablishment request, the target base station sends RRC reestablishment carrying that precision clock information to the UE. On the basis that the UE receives the precision clock information, the UE sends RRC Reestablishment Complete to the target base station, where the RRC reestablishment complete does not carry any actual information and only functions as RRC layer acknowledge.

In an embodiment, based on the embodiment shown in FIG. 1 or 2, if the RLF occurs in the UE, to enable the UE to obtain the precision clock information about the target base station in a timely and accurate manner, the source base station of the UE may also broadcast the SIB information, where the SIB information includes a list of neighbor cells including precision clock information of the neighbor cells. The SIB information is used for enabling the UE to select the target cell from the list of neighbor cells including the precision clock information of the neighbor cells when the RLF occurs, so as to complete RRC reestablishment. The SIB information broadcasted by the source base station may be SIB3 or SIB4 information, and parameters in the SIB3 or SIB4 information are for the current serving cell. After receiving the SIB information that includes the list of neighbor cells that includes the precision clock information of the neighbor cells and is broadcasted by the source base station, the UE may perform cell selection for the cells that support the precision clock information. When the UE selects a suitable cell, the UE sends an RRC Reestablishment Request message to the target base station to which the selected target cell belongs. On the basis that the target base station receives an RRC reestablishment request, the target base station sends RRC Reestablishment to the UE. On the basis that the UE receives the RRC Reestablishment, the UE reads the precision clock information of the target base station using the list of neighbor cells including the precision clock information of the neighbor cells, calculates a synchronized clock difference according to the clock information of the UE, and sends RRC Reestablishment Complete to a target gNB, where the RRC reestablishment complete does not carry any actual information and only functions as RRC layer acknowledge. The list of neighbor cells including the precision clock information of the neighbor cells includes the precision clock information of the target base station. For example, intra-frequency cell reselection information related to the neighbor cells in SIB3 includes the precision clock information of the cell; and inter-frequency cell reselection information related to the neighbor cells in SIB4 includes the precision clock information of the cell. After receiving the RRC Reestablishment, the UE uses a difference between precision clock information about a new cell in the list of neighbor cells and the clock information of the UE as the synchronized clock difference, that is, an advance that the UE needs to transmit currently.

FIG. 3 is a flowchart of another clock synchronization method according to an embodiment. As shown in FIG. 3, the method provided in this embodiment includes the following.

In S3010, a UE receives first RRC reconfiguration information sent by a source base station, where the first RRC reconfiguration information includes a clock difference, and the clock difference is a difference between a clock of a target base station and a clock of the source base station.

The clock synchronization method provided in this embodiment is applied to the UE. When the UE is in a currently accessed serving cell and cell handover needs to be performed due to movement or other reasons, if a target cell to which the UE is handed over and the current serving cell belong to different base stations, cell handover across base stations is involved. Since clock information of different base stations may be different, when the UE performs the cell handover across base stations, a communication problem of the UE in the target cell after the handover may occur due to clocks of the source base station and the target base station being out of synchronization. The source base station is a base station to which the current serving cell of the UE belongs, and the target base station is a base station to which the target cell that the UE is handed over to belongs. In the embodiment of the present application, both the source base station and the target base station may be gNBs in the 5G.

When the source base station determines that the UE accessing a cell to which the source base station belongs satisfies a handover condition, the source base station needs to send a handover request to the target base station to which the target cell that the UE is handed over to belongs, where the handover request includes a request for precision clock information. Since the source base station currently accessed by the UE may be different from the target base station to which the target cell that the UE is handed over to belongs, when the UE satisfies the handover condition, in order that a clock of the UE after the handover is synchronous with a clock of the target cell, the source base station needs to acquire the precision clock information of the target base station. The source base station sends the handover request to the target base station, where the handover request is used for requesting that the serving cell of the UE be handed over to the target cell provided by the target base station, and the handover request includes the request for the precision clock information. The precision clock information is a clock with a granularity of less than 10 milliseconds.

After the source base station sends the handover request to the target base station, the source base station receives the precision clock information of the target base station. The precision clock information of the target base station indicates a precise clock of the target base station. The source base station and the UE may determine a clock difference between the source base station and the target base station according to the precision clock information of the target base station and clock information of the source base station so that clock synchronization may be performed according to the clock difference.

After the clock difference between the target base station and the source base station is determined, if the source base station receives handover request acknowledge sent by the target base station, the source base station determines that the UE may be handed over to the target base station. After the target base station determines that the UE can be handed over to the target cell, the UE may obtain resource admission qualification of the target base station, and then the target base station sends the handover request acknowledge to the source base station. The source base station sends first RRC reconfiguration information to the UE, where the first RRC reconfiguration information includes the clock difference between the target base station and the source base station.

After the UE receives the first RRC reconfiguration information, the UE may perform delay compensation on the target cell according to the clock difference between the target base station and the source base station. In the case where the clock difference is positive, it means that the clock of the target base station is earlier than the clock of the source base station, and the UE may send information in advance to achieve synchronization. In the case where the clock difference is negative, it means that the clock of the target base station is later than the clock of the source base station, and the UE may delay sending information to achieve synchronization. Since the first RRC reconfiguration information sent by the source base station to the UE includes the clock difference between the target base station and the source base station, the UE can use the same clock as the target cell to communicate in the target cell when the UE is handed over to the target cell provided by the target base station.

In the clock synchronization method provided in this embodiment, the UE receives the first RRC reconfiguration information that is sent by the source base station and includes the clock difference between the target base station and the source base station, and thus the UE can perform delay compensation on the target cell according to the clock difference so that precision clock synchronization between the UE and the target base station to which the UE is handed over can be achieved after cell handover.

In an embodiment, before the UE receives the first RRC reconfiguration information sent by the source base station, the method further includes the following: the UE sends a neighbor cell measurement report to the source base station. Before performing the cell handover, the UE may measure the neighbor cell of the current serving cell and reports the measurement report of the neighbor cell to the base station to which the current serving cell belongs, that is, the source base station. After the source base station receives the neighbor cell measurement report, the source base station may first determine whether the base station to which the measured neighbor cell belongs is the source base station; if so, since the target cell to which the UE is handed over and the current serving cell of the UE are both provided by the source base station, the source base station may directly perform the cell handover of the UE without the problem of clock non-synchronization. If the base station to which the neighbor cell corresponding to the neighbor cell measurement report sent by the UE and received by the source base station belongs is different from the source base station, after the UE is handed over from the serving cell to the neighbor cell, since clock non-synchronization between the source base station and the base station to which the neighbor cell belongs, a handover problem occurs. Therefore, in the case where the base station to which the neighbor cell corresponding to the neighbor cell measurement report sent by the UE to the source base station belongs is different from the source base station, the source base station acquires the precision clock information from the target base station.

The neighbor cell measurement report sent by the UE may include an indication that the precision clock information is required, and the source base station determines that the UE needs to perform precision clock synchronization with the target base station needs according to the indication that the precision clock information is required. Alternatively, the UE sends the indication that precision clock information is required to the source base station before sending the neighbor cell measurement report to the source base station so that the neighbor cell measurement report sent by the UE does not need to include the indication that the precision clock information is required, and the source base station may determine that the UE needs to perform precision clock synchronization with the target base station according to the indication that the precision clock information is required sent by the UE before the UE sends the measurement report.

After the source base station receives the neighbor cell measurement report sent by the UE, the source base station may determine whether the UE satisfies the handover condition according to the neighbor cell measurement report. The case where the UE satisfies the handover condition may, for example, be a case where a service quality of a neighbor cell is better than a service quality of the current serving cell, or a case where a received signal strength of the neighbor cell is higher than a received signal strength of the current serving cell, or other cases. It is known to those skilled in the art that after receiving the neighbor cell measurement report sent by the UE, the source base station determines whether the UE satisfies the handover condition, which is not repeated here. In the case where the base station to which the neighbor cell corresponding to the neighbor cell measurement report received by the source base station belongs is different from the source base station, if the UE satisfies the handover condition, to synchronize the clock of the UE after handover with the clock of the target cell, the source base station needs to acquire the precision clock information of the target base station to which the neighbor cell belongs. The source base station sends the handover request to the target base station to which the neighbor cell belongs, where the handover request is used for requesting that the serving cell of the UE be handed over to the neighbor cell corresponding to the neighbor cell measurement report, and the handover request includes the request for the precision clock information. After the source base station sends the handover request to the target base station, the source base station receives the precision clock information of the target base station. The precision clock information of the target base station indicates a precise clock of the target base station. The source base station and the UE may determine a clock difference between the source base station and the target base station according to the precision clock information of the target base station and clock information of the source base station so that clock synchronization may be performed according to the clock difference.

FIG. 4 is a flowchart of another clock synchronization method according to an embodiment. As shown in FIG. 4, the method provided in this embodiment includes the following.

In S4010, a UE receives a second RRC reconfiguration message sent by a source base station, where the second RRC reconfiguration message includes a list of neighbor cells that support a precision clock information indication.

To obtain a cell supporting the precision clock information in a timely and accurate manner to enable the UE to perform cell measurement in a more targeted manner, the UE may receive the second RRC reconfiguration message sent by the source base station before sending a neighbor cell measurement report to the source base station. The second RRC reconfiguration message includes measurement control information, where the measurement control information includes the list of neighbor cells that support the precision clock information indication. Then the UE may perform measurement configuration according to the measurement control information. When the UE needs to perform the precision clock synchronization with the target cell after cell handover, the UE may perform neighbor cell measurement only for cells in the list of neighbor cells that support the precision clock information indication.

In S4020, the UE performs measurement configuration according to the second RRC reconfiguration message and sends an RRC ReconfigurationComplete message to the source base station.

After the UE performs measurement configuration according to the second RRC reconfiguration message sent by the source base station, the source base station may receive the RRC ReconfigurationComplete message sent by the UE. Then, the UE that has a requirement for the precision clock information may measure a cell that supports the precision clock information, thereby reducing measurement objects and improving a measurement performance. Then the UE sends the RRC ReconfigurationComplete message to the source base station.

In S4030, the UE measures cells in the list of neighbor cells that support the precision clock information indication and sends the measurement report of the neighbor cell that supports the precision clock information to the source base station, where the neighbor cell corresponding to the neighbor cell measurement report is the target cell to which the UE is handed over, a target base station to which the target cell belongs is different from the source base station, and the neighbor cell measurement report is used for the source base station to acquire the precision clock information of the target base station.

After the UE receives the second RRC reconfiguration message sent by the source base station, the UE measures the cells in the list of neighbor cells that support the precision clock information indication according to the second RRC reconfiguration message. Since the UE performs measurement configuration according to the second RRC reconfiguration message, the UE may measure neighbor cells in a targeted manner and only measure cells that support the precision clock information. Then the UE may send the measurement report of the neighbor cell that supports the precision clock information to the source base station.

Then, the source base station may perform S4040 and S4050. The source base station determines whether the UE is handed over according to the neighbor cell measurement report that supports the precision clock information and, in a handover process, performs delay compensation according to the clock difference between the source base station and the target base station to which the target cell that the UE is handed over to belongs.

In S4040, the UE receives first RRC reconfiguration information sent by the source base station, where the first RRC reconfiguration information includes a clock difference, and the clock difference is a difference between a clock of the target base station and a clock of the source base station.

In S4050, the UE performs delay compensation on the target cell according to the clock difference.

In the clock synchronization method provided in this embodiment, based on the embodiment shown in FIG. 3, since the UE first receives the second RRC reconfiguration message that includes the list of neighbor cells supporting the precision clock information and is sent by the source base station before sending the neighbor cell report to the source base station so that the UE can perform measurement configuration according to the second RRC reconfiguration message. Therefore, the UE can send the measurement report of the neighbor cell that supports the precision clock information to the source base station so that the UE that has the requirement for the precision clock information measures the cells that support the precision clock information, thereby reducing the measurement objects and improving the measurement performance.

In an embodiment, based on the embodiment shown in FIG. 3 or 4, if the RLF occurs in the UE, to enable the UE to obtain the precision clock information about the target base station in a timely and accurate manner, the UE may also receive SIB information broadcasted by the source base station, where the SIB information includes the list of neighbor cells that support the precision clock information indication. The SIB information is used for enabling the UE to select the target cell in the list of neighbor cells that support the precision clock information indication when the RLF occurs, so as to complete RRC reestablishment. The SIB information broadcasted by the source base station may be SIB3 or SIB4 information, and parameters in the SIB3 or SIB4 information are for the current serving cell. After receiving the SIB information that includes the list of neighbor cells supporting the precision clock information indication and is broadcasted by the source base station, the UE may perform cell selection for the cells that support the precision clock information. When the UE selects a suitable cell, the UE sends an RRC Reestablishment Request message to the target base station to which the selected target cell belongs, where the message includes the request for the precision clock information. On the basis that the target base station receives an RRC reestablishment request, the target base station sends RRC Reestablishment carrying that precision clock information to the UE. On the basis that the UE receives the precision clock information, the UE sends RRC Reestablishment Complete to the target base station, where the RRC Reestablishment Complete does not carry any actual information and only functions as RRC layer acknowledge.

In an embodiment, based on the embodiment shown in FIG. 3 or 4, if the RLF occurs in the UE, to enable the UE to obtain the precision clock information about the target base station in a timely and accurate manner, the UE may also receive the SIB information sent and broadcasted by the source base station, where the SIB information includes a list of neighbor cells including precision clock information of the neighbor cells. The SIB information is used for enabling the UE to select the target cell from the list of neighbor cells including the precision clock information of the neighbor cells when the RLF occurs, so as to complete RRC reestablishment. The SIB information broadcasted by the source base station may be SIB3 or SIB4 information, and parameters in the SIB3 or SIB4 information are for the current serving cell. After receiving the SIB information that includes the list of neighbor cells including the precision clock information of the neighbor cells and is broadcasted by the source base station, the UE may perform cell selection for the cells that support the precision clock information. When the UE selects a suitable cell, the UE sends an RRC Reestablishment Request message to the target base station to which the selected target cell belongs. On the basis that the target base station receives an RRC reestablishment request, the target base station sends RRC Reestablishment to the UE. On the basis that the UE receives the RRC Reestablishment, the UE reads the precision clock information of the target base station using the list of neighbor cells including the precision clock information of the neighbor cells, calculates a synchronized clock difference according to the clock information of the UE, and sends RRC Reestablishment Complete to a target gNB, where the RRC Reestablishment Complete does not carry any actual information and only functions as RRC layer acknowledge. The list of neighbor cells including the precision clock information of the neighbor cells includes the precision clock information of the target base station. For example, intra-frequency cell reselection information related to the neighbor cells in SIB3 includes the precision clock information of the cell; and inter-frequency cell reselection information related to the neighbor cells in SIB4 includes the precision clock information of the cell. After receiving the RRC Reestablishment, the UE uses a difference between precision clock information about a new cell in the list of neighbor cells and the clock information of the UE as the synchronized clock difference, that is, an advance that the UE needs to transmit currently.

FIG. 5 is a flowchart of a clock synchronization method according to an embodiment. As shown in FIG. 5, the method provided in this embodiment includes the following.

In S5010, an AMF receives a handover required message that is sent by a source base station and includes a request for precision clock information.

In S5020, the AMF sends a handover request including the request for the precision clock information to a target base station.

In S5030, the AMF receives third signaling that is sent by the target base station and carries the precision clock information of the target base station.

In S5040, the AMF sends second signaling carrying the precision clock information of the target base station to the source base station.

The clock synchronization method provided in this embodiment is applied to the AFM. The source base station sends the handover required message to the AMF through an NG interface, where the handover required message includes the request for the precision clock information. When the AMF receives the handover required message, the AMF sends the handover request to the target base station to which the neighbor cell belongs and receives third signaling that is sent by the target base station and carries the precision clock information of the target base station, where the handover request includes the request for the precision clock information. Then, the source base station receives the second signaling that is sent by the AMF and carries the precision clock information of the target base station. Each of the second signaling and the third signaling is dedicated signaling for carrying the precision clock information. The third signaling may include any one of the following: handover request acknowledge, a path switch request, or UE context release complete. The second signaling may include any one of the following: a handover command, path switch request acknowledge, a UE context release command, downlink radio access network (RAN) status transfer, paging, or location reporting control.

Figure 6:
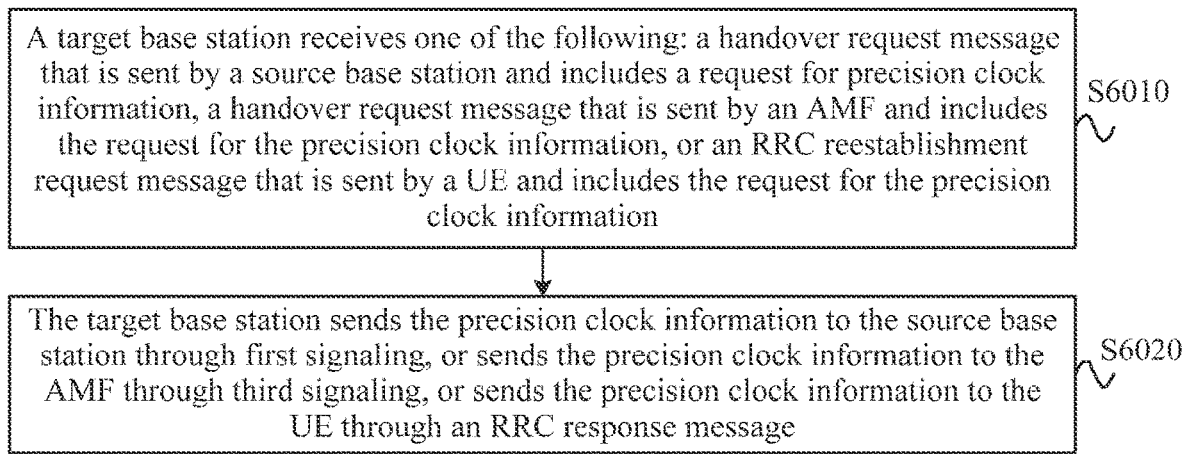
FIG. 6 is a flowchart of another clock synchronization method according to an embodiment.

FIG. 6 is a flowchart of a clock synchronization method according to an embodiment. As shown in FIG. 6, the method provided in this embodiment includes the following.

In S6010, a target base station receives one of the following: a handover request message that is sent by a source base station and includes a request for precision clock information, a handover request message that is sent by an AMF and includes the request for the precision clock information, or an RRC reestablishment request message that is sent by a UE and includes the request for the precision clock information.

In S6020, the target base station sends the precision clock information to the source base station through first signaling, or sends the precision clock information to the AMF through third signaling, or sends the precision clock information to the UE through an RRC response message.

The clock synchronization method provided in this embodiment is applied to the target base station. Regardless of whether the target base station receives the handover request message that is sent by the source base station and includes the request for the precision clock information or the handover request message that is sent by the AMF and includes the request for the precision clock information or the RRC reestablishment request message that is sent by the UE and includes the request for the precision clock information, the precision clock information of the target base station that needs to be known by the source base station or the UE may be known. Therefore, the target base station may send the precision clock information to the source base station through the first signaling, or sends the precision clock information to the AMF through the third signaling, or sends the precision clock information to the UE through the RRC response message. The processing performed by the source base station or the UE after the precision clock information is received is described in the preceding embodiments and is not repeated here. The first signaling includes any one of the following: handover request acknowledge, a retrieve UE context request, XN-U address indication, or UE context release.

Figure 7:
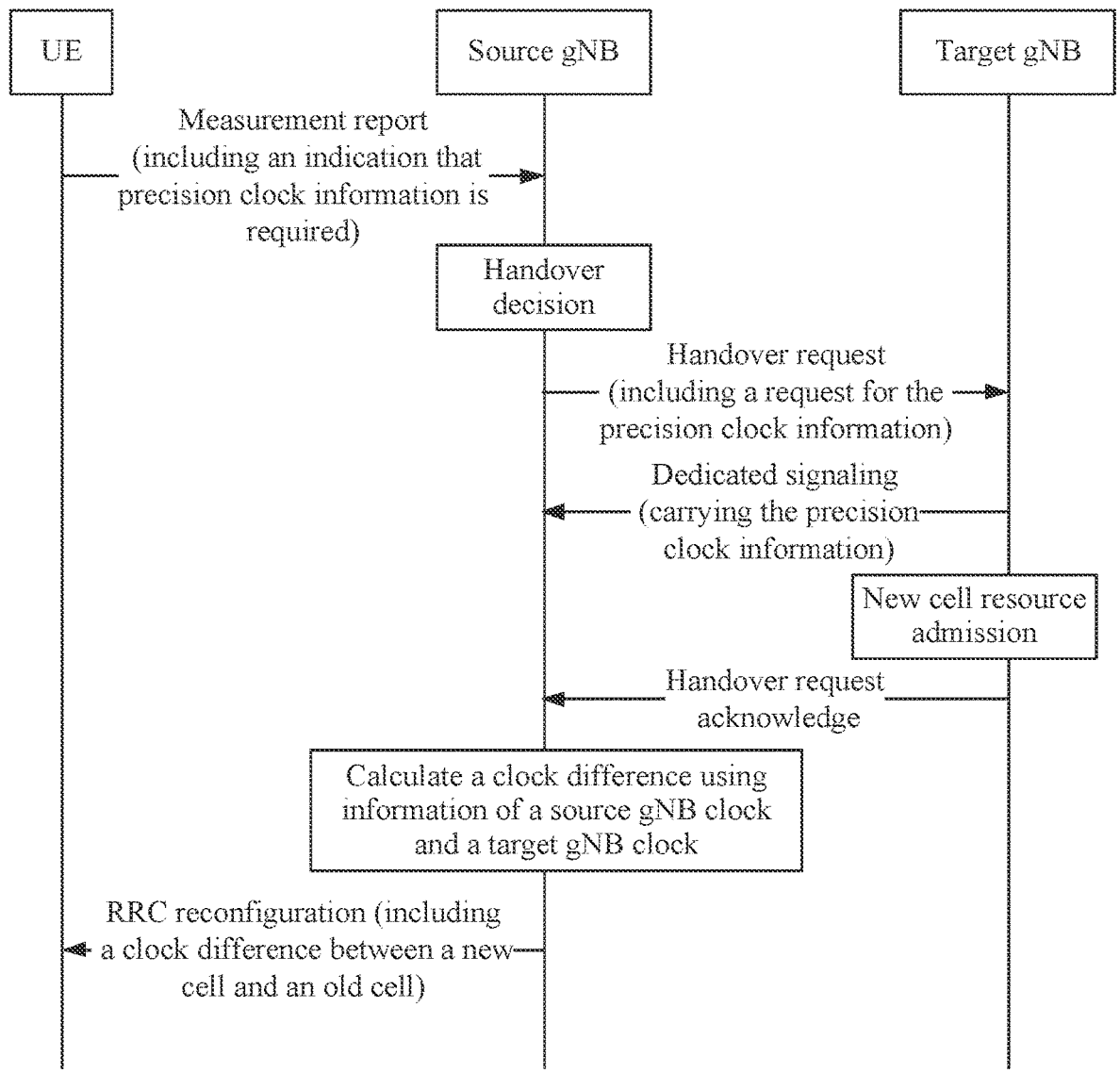
FIG. 7 is a flowchart of interaction in a clock synchronization method according to an embodiment.

FIG. 7 is a flowchart of interaction in a clock synchronization method according to an embodiment. As shown in FIG. 7, the method provided in this embodiment includes the following.

In 1, a UE measures a neighbor cell and reports a measurement result including an indication that precision clock information is required to a source gNB. Alternatively, the measurement report does not include the indication, but the source gNB may know the indication according to a precision clock request of the UE before measurement, and the source gNB determines whether the UE satisfies a handover condition.

In 2, the source gNB sends a handover request message to a target gNB, where the message includes a request for the precision clock information.

In 3, after the target gNB receives the handover request message sent by the source gNB, the target gNB sends dedicated signaling carrying the precision clock information to the source gNB.

In 4, after the UE obtains resource admission qualification of the target gNB, the target gNB sends a handover request acknowledge message to the source gNB.

In 5, the source gNB calculates a clock difference (target gNB clock-source gNB clock) between a new cell and an old cell by using the precision clock information of the target gNB in the dedicated signaling and according to clock information of the source gNB. Then, the source gNB sends "RRC Reconfiguration" to the UE, where the RRC reconfiguration includes the clock difference between the new cell and the old cell. The UE sends information in advance to achieve synchronization in the case where the clock difference between the new cell and the old cell is positive, otherwise, the UE delays sending information to achieve synchronization in the case where the clock difference between the new cell and the old cell is negative.

Based on the request for the precision clock information from the source gNB, the target gNB sends the dedicated signaling carrying the precision clock information. The dedicated signaling includes one of the following manners: handover request acknowledge, a retrieve UE context request, XN-U address indication, or UE context release.

This embodiment describes handover between base stations based on an Xn interface. To obtain the precision clock information about the target base station in a timely and accurate manner, the source base station receives the dedicated signaling including the precision clock information sent by the target base station; the clock difference between the new cell and the old cell is obtained based on the signaling and local clock information of the source base station; the UE performs delay compensation on the target cell through the clock difference.

Figure 8:
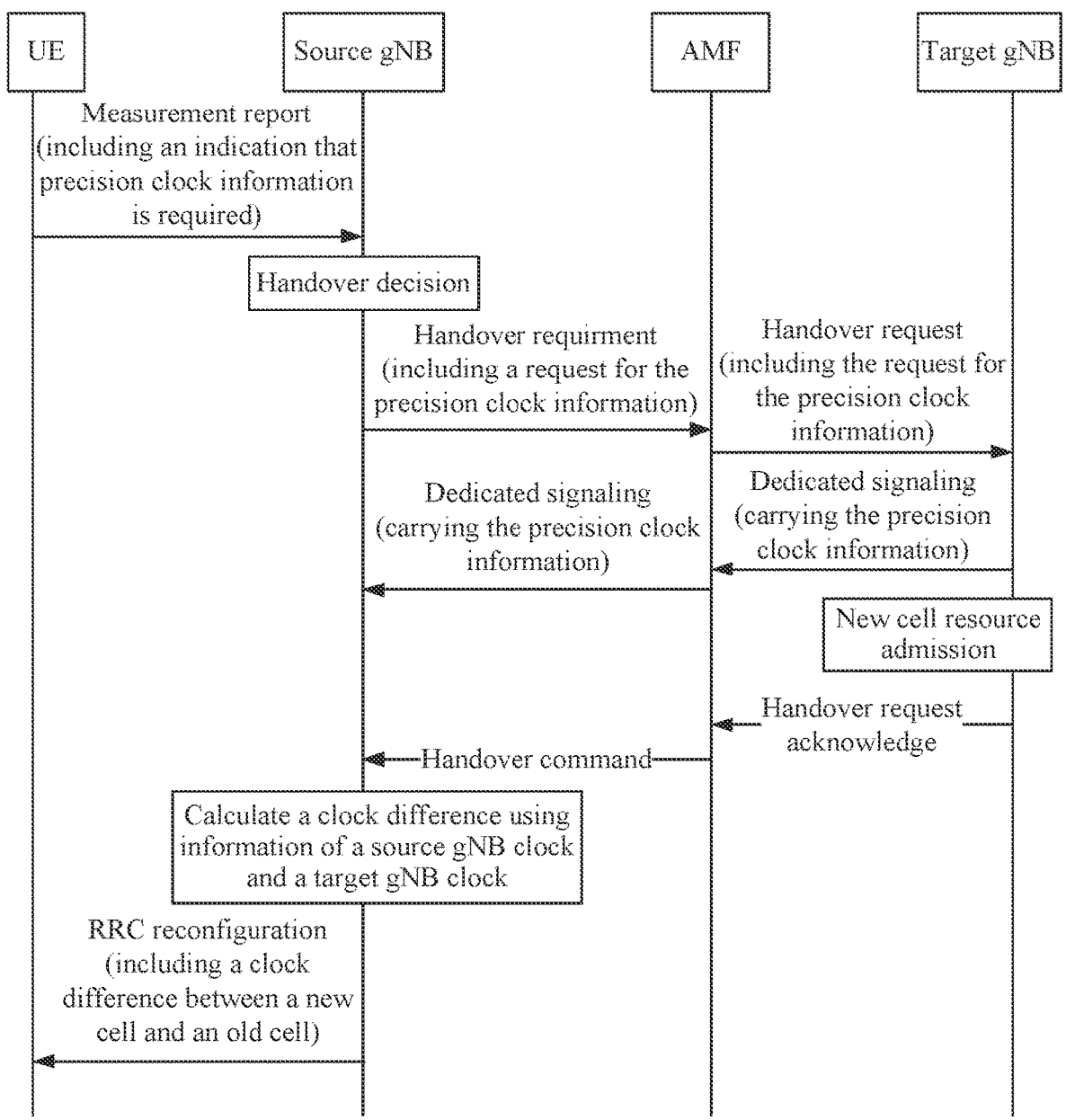
FIG. 8 is a flowchart of interaction in another clock synchronization method according to an embodiment.

FIG. 8 is a flowchart of interaction in another clock synchronization method according to an embodiment. As shown in FIG. 8, the method provided in this embodiment includes the following.

In 1, a UE measures a neighbor cell and reports a measurement result including an indication that precision clock information is required to a source gNB. Alternatively, the measurement report does not include the indication, but the source gNB may know the indication according to a precision clock request of the UE before measurement, and the source gNB determines whether the UE satisfies a handover condition.

In 2, the source gNB sends a handover required message to an AMF, where the message includes a request for the precision clock information.

In 3, the AMF sends a handover request message to a target gNB, where the message includes the request for the precision clock information.

In 4, after the target gNB receives the handover request message sent by the AMF, the target gNB sends dedicated signaling carrying the precision clock information to the AMF.

In 5, after the AMF receives the dedicated signaling carrying the precision clock information sent by the target gNB, the AMF sends the dedicated signaling carrying the precision clock information to the source gNB.

In 6, after the UE obtains resource admission qualification of the target gNB, the target gNB sends a handover request acknowledge message to the AMF.

In 7, the AMF sends a handover command message to the source gNB.

In 8, the source gNB calculates a clock difference (target gNB clock-source gNB clock) between a new cell and an old cell by using the precision clock information of the target gNB in the dedicated signaling and according to clock information of the source gNB. Then, the source gNB sends "RRC Reconfiguration" to the UE, where the RRC reconfiguration includes the clock difference between the new cell and the old cell. The UE sends information in advance to achieve synchronization in the case where the clock difference between the new cell and the old cell is positive, otherwise, the UE delays sending information to achieve synchronization in the case where the clock difference between the new cell and the old cell is negative.

Based on the request for the precision clock information from the AMF, the target gNB sends the dedicated signaling carrying the precision clock information. The dedicated signaling includes one of the following manners: handover request acknowledge, a path switch request, UE context release complete, UE context release, paging, or a location report.

Based on the request for the precision clock information from the source gNB, the AMF sends the dedicated signaling carrying the precision clock information. The dedicated signaling includes one of the following manners: a handover command, path switch request acknowledge, a UE context release command, downlink RAN status transfer, paging, or location reporting control.

This embodiment describes handover between base stations based on an NG interface. To obtain the precision clock information about the target base station in a timely and accurate manner, the source base station receives the dedicated signaling including the precision clock information of the target base station sent by the AMF; the clock difference between the new cell and the old cell is obtained based on the signaling and local clock information of the source base station; the UE performs delay compensation on the target cell through the clock difference.

Figure 9:
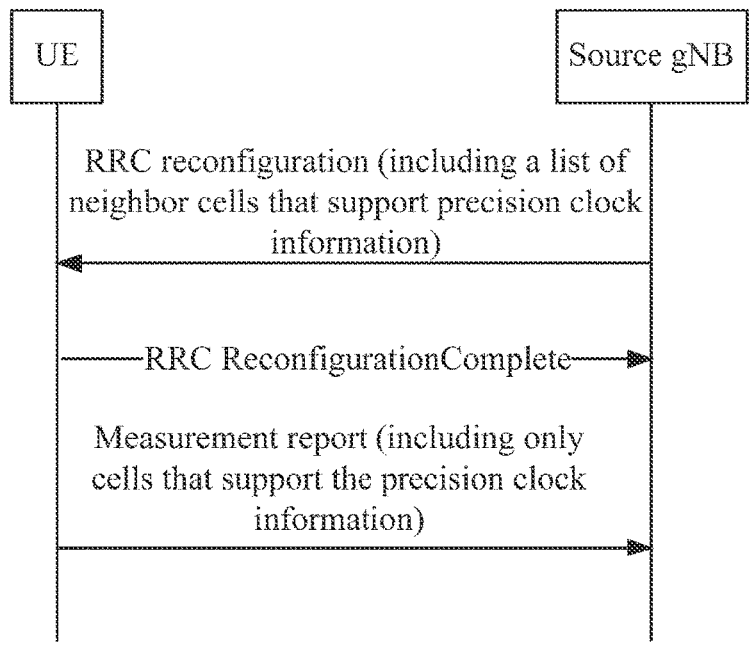
FIG. 9 is a flowchart of interaction in another clock synchronization method according to an embodiment.

FIG. 9 is a flowchart of interaction in another clock synchronization method according to an embodiment. As shown in FIG. 9, the method provided in this embodiment includes the following.

In 1, based on a precision clock request before measurement, a source gNB issues measurement control to a UE and configures a measurement type of the UE through an RRC reconfiguration message, where the configuration includes a list of neighbor cells that support a precision clock information indication.

In 2, the UE performs measurement configuration on an RRC protocol end of the UE according to the measurement control issued by the source gNB and sends an RRC ReconfigurationComplete message to the source gNB to indicate that the measurement configuration is completed.

In 3, through the list of neighbor cells that support the precision clock information indication included in RRC reconfiguration in a measurement stage, the UE that has a requirement for precision clock information measures cells that support the precision clock information, and the UE reports a measurement report including only the cells that support the precision clock information to the source gNB according to the measurement configuration.

The source gNB makes determination according to the measurement report to determine whether the UE is handed over, performs resource admission in a new cell, and applies for new air interface resources for the UE after the resource admission is successful; and delay compensation is achieved using a clock difference between the new cell and the old cell in a handover process.

In this embodiment, based on the precision clock request before the measurement, during triggering measurement and reporting, to obtain the cells that support the precision clock information in a timely and accurate manner, the list of neighbor cells that support the precision clock information indication is included in the RRC reconfiguration in the measurement stage so that the UE that has the requirement for the precision clock information measures the cells that support the precision clock information, thereby reducing the measurement objects and improving the measurement performance.

Figure 10:
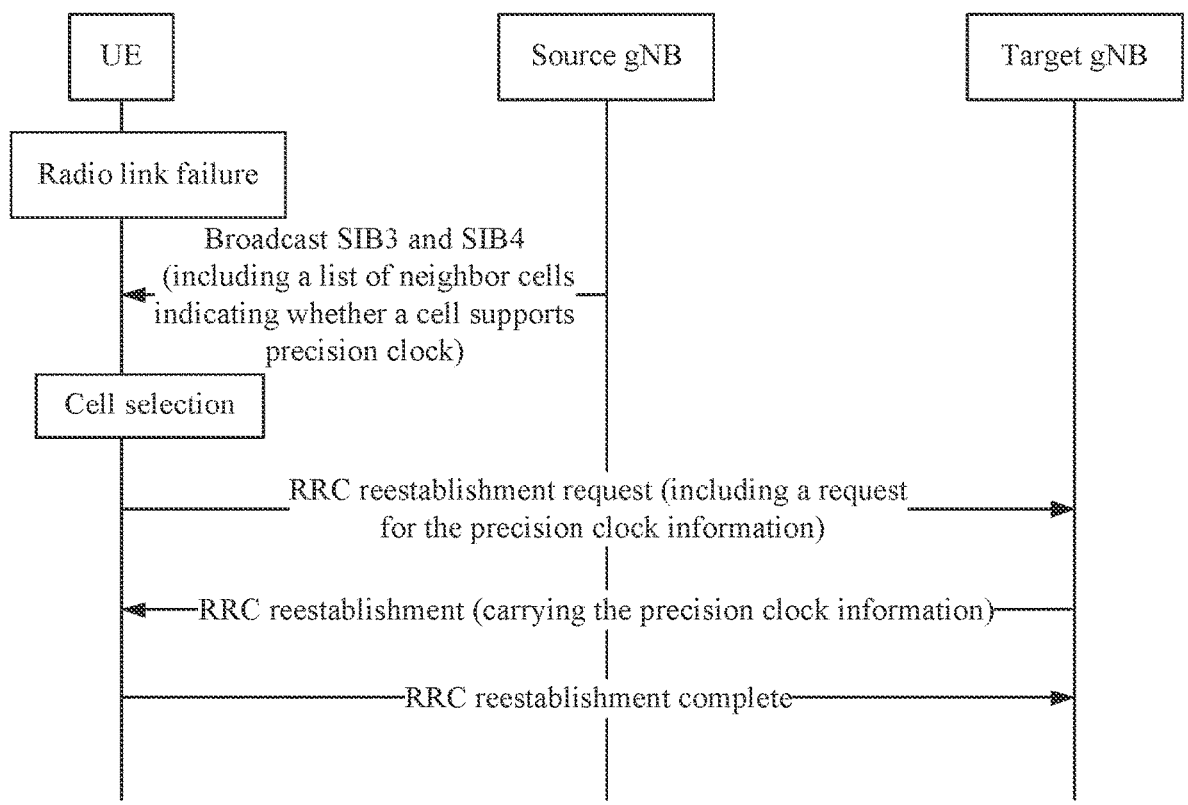
FIG. 10 is a flowchart of interaction in another clock synchronization method according to an embodiment.

FIG. 10 is a flowchart of interaction in another clock synchronization method according to an embodiment. As shown in FIG. 10, the method provided in this embodiment includes the following.

In 1, in a case of an RLF, a UE receives SIB3 and SIB4 information broadcasted by a source gNB, where the SIB3 and SIB4 includes lists of neighbor cells indicating whether cells support precision clock information.

In 2, after the UE acquires the list of neighbor cells that include and support the precision clock information, the UE performs a cell selection procedure for cells that support the precision clock information.

In 3, after selecting a suitable cell, the UE sends an RRC Reestablishment Request message to a target gNB, where the message includes a request for the precision clock information.

In 4, on the basis that the target gNB receives an RRC reestablishment request, the target gNB sends RRC Reestablishment carrying the precision clock information to the UE.

In 5, on the basis that the UE receives the precision clock information, the UE sends RRC Reestablishment Complete to the target gNB, where the RRC Reestablishment Complete does not carry any actual information and only functions as RRC layer acknowledge.

In this embodiment, in the case of the RLF, to obtain the precision clock information about the target base station in a timely and accurate manner, the source base station broadcasts the SIB3 and SIB4 information including lists of neighbor cells, one list of neighbor cells indicates that cells support the precision clock information and another list of neighbor cells indicates that cells do not support the precision clock information, and thus the UE performs cell selection for the cells that support the precision clock information, and the target gNB sends the precision clock information to the UE in an RRC reestablishment process.

Figure 11:
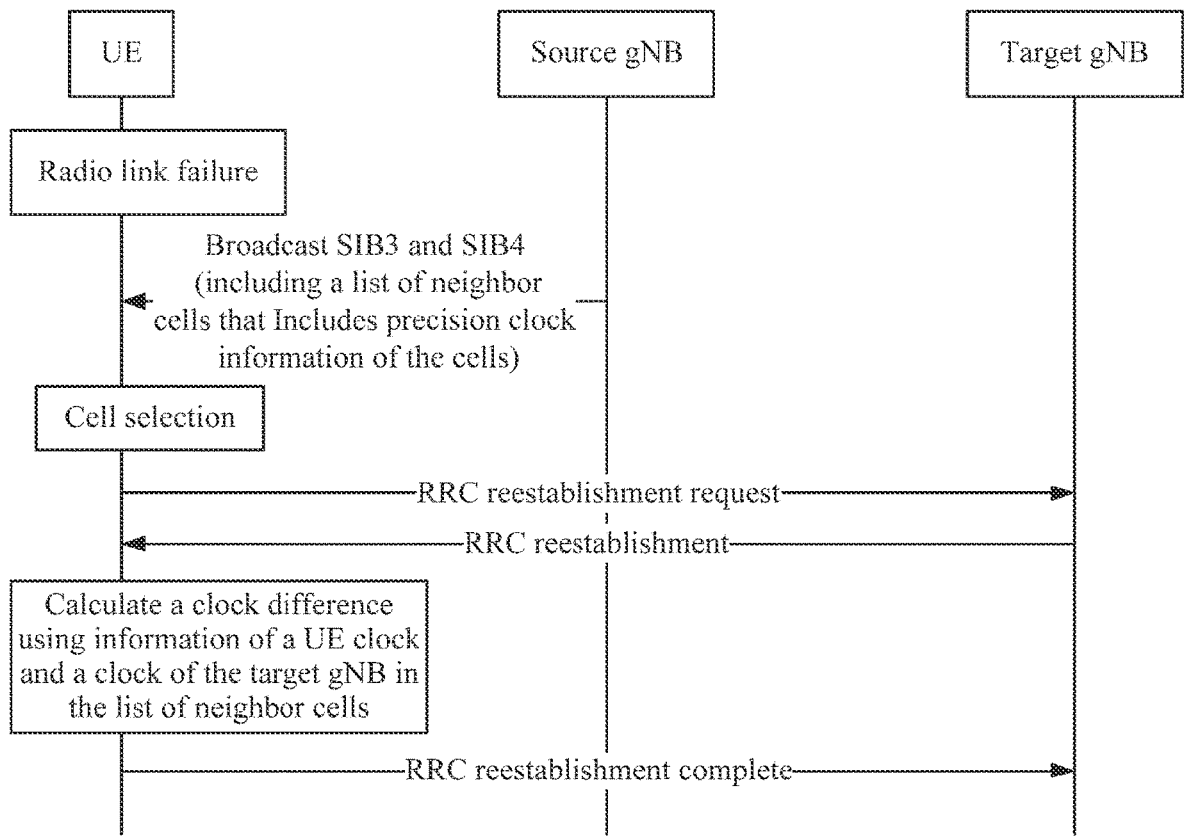
FIG. 11 is a flowchart of interaction in another clock synchronization method according to an embodiment.

FIG. 11 is a flowchart of interaction in another clock synchronization method according to an embodiment. As shown in FIG. 11, the method provided in this embodiment includes the following.

In 1, in a case of an RLF, a UE receives SIB3 and SIB4 information broadcasted by a source gNB, where a list of neighbor cells in the SIB3 and SIB4 information includes precision clock information of each cell.

In 2, after the UE acquires the list of neighbor cells including the precision clock information, the UE performs a cell selection procedure for cells that support the precision clock information.

In 3, after selecting a suitable cell, the UE sends an RRC Reestablishment Request message to a target gNB.

In 4, on the basis that the target gNB receives an RRC reestablishment request, the target gNB sends RRC Reestablishment to the UE.

In 5, on the basis that the UE receives the precision clock information, the UE reads the precision clock information of the target gNB using the list of neighbor cells including the precision clock information, calculates a synchronized clock difference according to clock information of the UE, and sends RRC Reestablishment Complete to the target gNB, where the RRC Reestablishment Complete does not carry any actual information and only functions as RRC layer acknowledge.

The list of neighbor cells includes the precision clock information of the target gNB. For example, intra-frequency cell reselection information related to the neighbor cells in SIB3 includes the precision clock information of the cell; and inter-frequency cell reselection information related to the neighbor cells in SIB4 includes the precision clock information of the cell.

After receiving the RRC Reestablishment, the UE uses a difference between precision clock information about a new cell in the list of neighbor cells and the clock information of the UE as the synchronized clock difference, that is, an advance that the UE needs to transmit currently.

In this embodiment, in the case of the RLF, to obtain the precision clock information about the target base station in a timely and accurate manner, the precision clock information of each cell is included in the list of neighbor cells in the SIB3 and SIB4 information broadcasted by the source base station, and thus the UE performs cell selection for the cells that support the precision clock information, and the UE performs delay compensation based on the precision clock information of the cells in the SIB information in an RRC reestablishment process.

Figure 12:
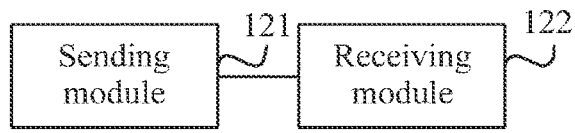
FIG. 12 is a structural diagram of a clock synchronization apparatus according to an embodiment.

FIG. 12 is a structural diagram of a clock synchronization apparatus according to an embodiment. The clock synchronization apparatus provided in this embodiment is configured in a source base station. As shown in FIG. 12, the clock synchronization apparatus provided in this embodiment includes a sending module 121 and a receiving module 122. The sending module 121 is configured such that if the source base station determines that a UE satisfies a handover condition, the source base station sends a handover request to a target base station, where the handover request includes a request for precision clock information. The receiving module 122 is configured such that the source base station receives the precision clock information of the target base station.

Figure 13:
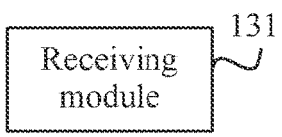
FIG. 13 is a structural diagram of another clock synchronization apparatus according to an embodiment.

FIG. 13 is a structural diagram of another clock synchronization apparatus according to an embodiment. The clock synchronization apparatus provided in this embodiment is configured in a UE. As shown in FIG. 13, the clock synchronization apparatus provided in this embodiment includes a receiving module 131 configured to receive first RRC reconfiguration information sent by a source base station, where the first RRC reconfiguration information includes a clock difference, and the clock difference is a difference between a clock of a target base station and a clock of the source base station.

Figure 14:
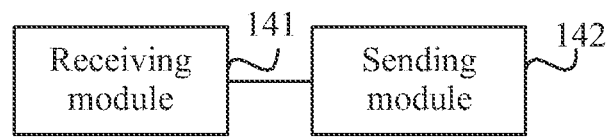
FIG. 14 is a structural diagram of another clock synchronization apparatus according to an embodiment.

FIG. 14 is a structural diagram of another clock synchronization apparatus according to an embodiment. The clock synchronization apparatus provided in this embodiment is set in an AMF. As shown in FIG. 14, the clock synchronization apparatus provided in this embodiment includes a receiving module 141 and a sending module 142. The receiving module 141 is configured to receive a handover required message that includes a request for precision clock information and is sent by a source base station. The sending module 142 is configured to send a handover request including the request for the precision clock information to a target base station. The receiving module 141 is further configured to receive third signaling that is sent by the target base station and carries the precision clock information of the target base station. The sending module 142 is further configured to send second signaling carrying the precision clock information of the target base station to the source base station.

Figure 15:
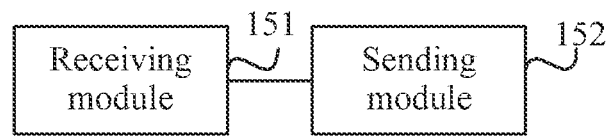
FIG. 15 is a structural diagram of another clock synchronization apparatus according to an embodiment.

FIG. 15 is a structural diagram of another clock synchronization apparatus according to an embodiment. The clock synchronization apparatus provided in this embodiment is set in a target base station. As shown in FIG. 15, the clock synchronization apparatus provided in this embodiment includes a receiving module 151 and a sending module 152. The receiving module 151 is configured to receive one of the following: a handover request message that is sent by a source base station and includes a request for precision clock information, a handover request message that is sent by an AMF and includes the request for the precision clock information, or an RRC reestablishment request message that is sent by a UE and includes the request for the precision clock information. The sending module 152 is configured such that the target base station sends the precision clock information to the source base station through first signaling, or sends the precision clock information to the AMF through third signaling, or sends the precision clock information to the UE through an RRC response message.

Figure 16:
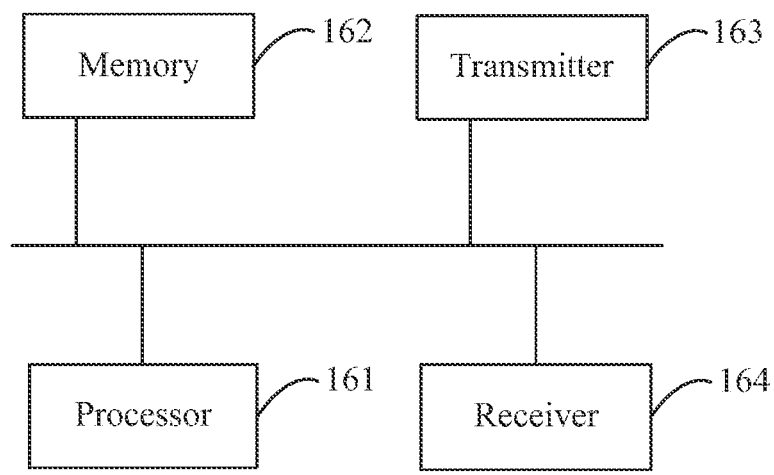
FIG. 16 is a structural diagram of a base station according to an embodiment.

FIG. 16 is a structural diagram of a base station according to an embodiment. As shown in FIG. 16, the base station includes a processor 161, a memory 162, a transmitter 163, and a receiver 164. One or more processors 161 may be provided in the base station, and one processor 161 is used as an example in FIG. 16. The processor 161 and the memory 162 in the base station may be connected through a bus or in other manners. In FIG. 16, the connection through the bus is used as an example.

As a computer-readable storage medium, the memory 162 may be configured to store software programs, computer-executable programs and modules, such as program instructions/modules (for example, the sending module 121 and the receiving module 122) corresponding to the clock synchronization method in the embodiment of the present application shown in FIG. 1 or 2. The processor 161 executes the software programs, instructions and modules stored in the memory 162 to implement at least one function application and data processing of the base station, that is, the clock synchronization method described above.

The memory 162 may mainly include a program storage region and a data storage region. The program storage region may store an operating system and an application program required for at least one function, and the data storage region may store data or the like created according to the use of the base station. Additionally, the memory 162 may include a high-speed random-access memory and may further include a non-volatile memory, for example, at least one magnetic disk memory and flash memory or other non-volatile solid-state memories.

The transmitter 163 is a combination of modules or devices capable of transmitting radio frequency signals into space and includes, for example, a combination of a radio frequency transmitter, an antenna and another device. The receiver 164 is a combination of modules or devices capable of receiving radio frequency signals from space and includes, for example, a combination of a radio frequency receiver, an antenna and other devices.

Figure 17:
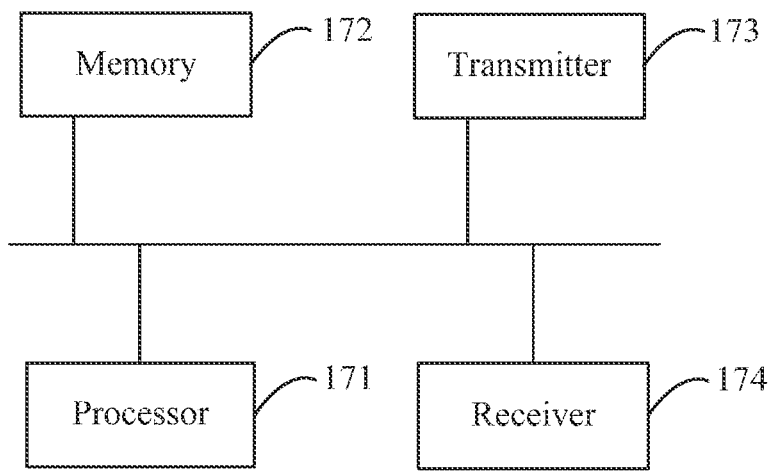
FIG. 17 is a structural diagram of a UE according to an embodiment.

FIG. 17 is a structural diagram of a UE according to an embodiment. As shown in FIG. 17, the UE includes a processor 171, a memory 172, a transmitter 173, and a receiver 174. One or more processors 171 may be provided in the UE, and one processor 171 is used as an example in FIG. 17. The processor 171 and the memory 172 in the UE may be connected through a bus or in other manners. In FIG. 17, the connection through the bus is used as an example.

As a computer-readable storage medium, the memory 172 may be configured to store software programs, computer-executable programs and modules, such as program instructions/modules (for example, the receiving module 131) corresponding to the clock synchronization method in the embodiment of the present application shown in FIG. 3 or 4. The processor 171 executes the software programs, instructions and modules stored in the memory 172 so as to implement at least one function application and data processing of the UE, that is, the clock synchronization method described above.

The memory 172 may mainly include a program storage region and a data storage region. The program storage region may store an operating system and an application program required for at least one function, and the data storage region may store data or the like created according to the use of the UE. Additionally, the memory 172 may include a high-speed random-access memory and may further include a non-volatile memory, for example, at least one magnetic disk memory and flash memory or other non-volatile solid-state memories.

The transmitter 173 is a combination of modules or devices capable of transmitting radio frequency signals into space and includes, for example, a combination of a radio frequency transmitter, an antenna and another device. The receiver 174 is a combination of modules or devices capable of receiving radio frequency signals from space and includes, for example, a combination of a radio frequency receiver, an antenna and other devices.

Figure 18:
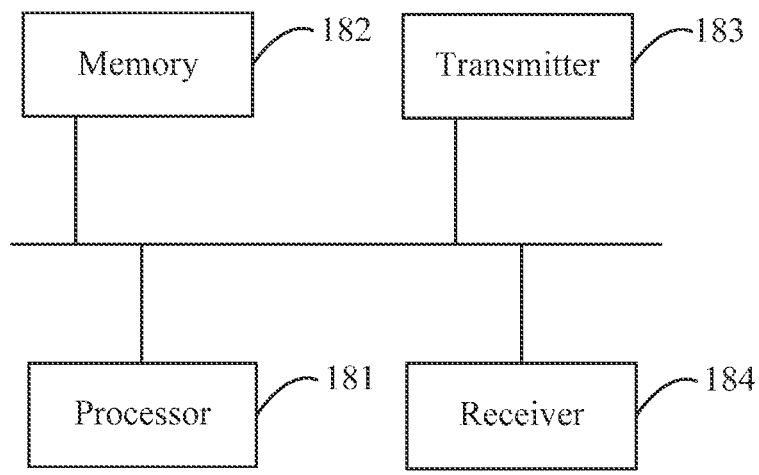
FIG. 18 is a structural diagram of an AMF according to an embodiment.

FIG. 18 is a structural diagram of an AMF according to an embodiment. As shown in FIG. 18, the AMF includes a processor 181, a memory 182, a transmitter 183, and a receiver 184. One or more processors 181 may be provided in the AMF, and one processor 181 is used as an example in FIG. 18. The processor 181 and the memory 182 in the AMF may be connected through a bus or in other manners. In FIG. 18, the connection through the bus is used as an example.

As a computer-readable storage medium, the memory 182 may be configured to store software programs, computer-executable programs and modules, such as program instructions/modules (for example, the receiving module 141 and the sending module 142) corresponding to the clock synchronization method in the embodiment of the present application shown in FIG. 5. The processor 181 executes the software programs, instructions and modules stored in the memory 182 so as to implement at least one function application and data processing of the AMF, that is, the clock synchronization method described above.

The memory 182 may mainly include a program storage region and a data storage region. The program storage region may store an operating system and an application program required for at least one function, and the data storage region may store data or the like created according to the use of the UE. Additionally, the memory 182 may include a high-speed random-access memory and may further include a non-volatile memory, for example, at least one magnetic disk memory and flash memory or other non-volatile solid-state memories.

The transmitter 183 is a combination of modules or devices capable of transmitting radio frequency signals into space and includes, for example, a combination of a radio frequency transmitter, an antenna and another device. The receiver 184 is a combination of modules or devices capable of receiving radio frequency signals from space and includes, for example, a combination of a radio frequency receiver, an antenna and other devices.

Figure 19:
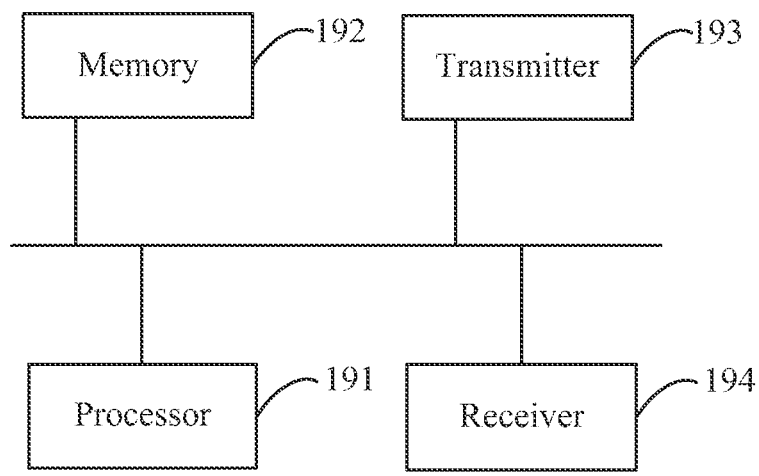
FIG. 19 is a structural diagram of a base station according to an embodiment.

FIG. 19 is a structural diagram of a base station according to an embodiment. As shown in FIG. 19, the base station includes a processor 191, a memory 192, a transmitter 193, and a receiver 194. One or more processors 191 may be provided in the base station, and one processor 191 is used as an example in FIG. 19. The processor 191 and the memory 192 in the base station may be connected through a bus or in other manners. In FIG. 19, the connection through the bus is used as an example.

As a computer-readable storage medium, the memory 192 may be configured to store software programs, computer-executable programs and modules, such as program instructions/modules (for example, the receiving module 151 and the sending module 152) corresponding to the clock synchronization method in the embodiment of the present application shown in FIG. 6. The processor 191 executes the software programs, instructions and modules stored in the memory 192 so as to implement at least one function application and data processing of the base station, that is, the clock synchronization method described above.

The memory 192 may mainly include a program storage region and a data storage region. The program storage region may store an operating system and an application program required for at least one function, and the data storage region may store data or the like created according to the use of the base station. Additionally, the memory 192 may include a high-speed random-access memory and may further include a non-volatile memory, for example, at least one magnetic disk memory and flash memory or other non-volatile solid-state memories.

The transmitter 193 is a combination of modules or devices capable of transmitting radio frequency signals into space and includes, for example, a combination of a radio frequency transmitter, an antenna and another device. The receiver 194 is a combination of modules or devices capable of receiving radio frequency signals from space and includes, for example, a combination of a radio frequency receiver, an antenna and other devices.

An embodiment of the present application further provides a storage medium including computer-executable instructions, where when executed by a computer processor, the computer-executable instructions are used for performing a clock synchronization method. The method includes the following: if a source base station determines that a UE satisfies a handover condition, the source base station sends a handover request to a target base station, where the handover request includes a request for precision clock information; and the source base station receives the precision clock information of the target base station.

An embodiment of the present application further provides a storage medium including computer-executable instructions, where when executed by a computer processor, the computer-executable instructions are used for performing a clock synchronization method. The method includes the following: a UE receives first RRC reconfiguration information sent by a source base station, where the first RRC reconfiguration information includes a clock difference, and the clock difference is a difference between clocks of a target base station and the source base station.

An embodiment of the present application further provides a storage medium including computer-executable instructions, where when executed by a computer processor, the computer-executable instructions are used for performing a clock synchronization method. The method includes the following: an AMF receives a handover required message that is sent by a source base station and includes a request for precision clock information; the AMF sends a handover request including the request for the precision clock information to a target base station; the AMF receives third signaling that is sent by the target base station and carries the precision clock information of the target base station; and the AMF sends second signaling carrying the precision clock information of the target base station to the source base station.

An embodiment of the present application further provides a storage medium including computer-executable instructions, where when executed by a computer processor, the computer-executable instructions are used for performing a clock synchronization method. The method includes the following: a target base station receives a handover request message that is sent by a source base station and includes a request for precision clock information or a handover request message that is sent by an AMF and includes the request for the precision clock information or an RRC reestablishment request message that is sent by a UE and includes the request for the precision clock information; and the target base station sends the precision clock information to the source base station through first signaling, or sends the precision clock information to the AMF through third signaling, or sends the precision clock information to the UE through an RRC response message.

The term user terminal encompasses any appropriate type of wireless user equipment, such as a mobile phone, a portable data processing apparatus, a portable web browser or a vehicle-mounted mobile station.

In general, multiple embodiments of the present application may be implemented in hardware, dedicated circuits, software, logics or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). The computer-readable medium may include a non-transitory storage medium. The data processor may be of any type suitable for the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A clock synchronization method, comprising:
when a source base station determines that a user equipment (UE) satisfies a handover condition, sending, by the source base station, a handover request to a target base station, wherein the handover request comprises a request for precision clock information; and
receiving, by the source base station, the precision clock information of the target base station.

2. The method of claim 1, wherein receiving, by the source base station, the precision clock information of the target base station comprises:
receiving, by the source base station from the target base station, first signaling that carries the precision clock information of the target base station.

3. The method of claim 2, wherein the first signaling comprises one of the following: handover request acknowledge, a retrieve UE context request, Xn-User plane (Xn-U) address indication, or UE context release.

4. The method of claim 1, wherein sending, by the source base station, the handover request to the target base station comprises:
sending, by the source base station, a handover required message to a core access and mobility management function (AMF), wherein the handover required message comprises the request for the precision clock information; and
wherein receiving, by the source base station, the precision clock information of the target base station comprises:
receiving, by the source base station from the AME, second signaling that carries the precision clock information of the target base station.

5. The method of claim 4, wherein the second signaling comprises one of the following: a handover command, path switch request acknowledge, a UE context release command, downlink radio access network (RAN) status transfer, paging, or location reporting control.

6. The method of claim 1, wherein after the source base station receives the precision clock information of the target base station, the method further comprises:
sending, by the source base station, first radio resource control (RRC) reconfiguration information to the UE, wherein the first RRC reconfiguration information comprises a clock difference, wherein the clock difference is a difference between a clock of the target base station and a clock of the source base station.

7. The method of claim 1, wherein before the source base station determines that the UE satisfies the handover condition, the method further comprises:
   receiving, by the source base station from the UE, a neighbor cell measurement report, wherein the neighbor cell measurement report comprises an indication that the precision clock information is required.

8. The method of claim 1, wherein before the source base station determines that the UE satisfies the handover condition, the method further comprises:
   receiving, by the source base station from the UE, an indication that the precision clock information is required.

9. The method of claim 1, wherein before the source base station determines that the UE satisfies the handover condition, the method further comprises:
   sending, by the source base station, a second RRC reconfiguration message to the UE, wherein the second RRC reconfiguration message comprises a list of neighbor cells that support a precision clock information indication.

10. The method of claim 1, further comprising:
    broadcasting, by the source base station, system information block (SIB) information, wherein the SIB information comprises a list of neighbor cells that support a precision clock information indication.

11. The method of claim 1, further comprising:
    broadcasting, by the source base station, SIB information, wherein the SIB information comprises a list of neighbor cells comprising precision clock information of the neighbor cells.

12. A base station, comprising a processor and a memory, wherein the processor is configured to execute program instructions stored in the memory to perform the clock synchronization method of claim 1.

13. A non-transitory storage medium storing computer programs which, when executed by a processor, perform the clock synchronization method of claim 1.

14. A clock synchronization method, comprising:
    sending, by a user equipment (UE) to a source base station, an indication that precision clock information is required;
    sending, by the UE, a neighbor cell measurement report to the source base station or the neighbor cell measurement report comprises an indication that precision clock information is required;
    receiving, by the UE from the source base station, first radio resource control (RRC) reconfiguration information, wherein the first RRC reconfiguration information comprises a clock difference, wherein the clock difference is a difference between a clock of a target base station and a clock of the source base station.

15. A user equipment (UE), comprising a processor and a memory, wherein the processor is configured to execute program instructions stored in the memory to perform the clock synchronization method of claim 14.

16. A clock synchronization method, comprising:
    receiving, by a target base station, one of the following: a handover request message that is sent by a source base station and comprises a request for precision clock information, a handover request message that is sent by a core access and mobility management function (AMF) and comprises a request for precision clock information, or a radio resource control (RRC) reestablishment request message that is sent by a user equipment (UE) and comprises a request for precision clock information; and
    sending, by the target base station, the precision clock information to the source base station through first signaling, or sending the precision clock information to the AMF through third signaling, or sending the precision clock information to the UE through an RRC response message.

17. A base station, comprising a processor and a memory, wherein the processor is configured to execute program instructions stored in the memory to perform the clock synchronization method of claim 16.

* * * * *